(12) United States Patent
Arai et al.

(10) Patent No.: US 11,640,041 B2
(45) Date of Patent: May 2, 2023

(54) OPTICAL UNIT

(71) Applicant: NIDEC SANKYO CORPORATION, Nagano (JP)

(72) Inventors: Tsutomu Arai, Nagano (JP); Shogo Kasahara, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/476,413

(22) Filed: Sep. 15, 2021

(65) Prior Publication Data

US 2022/0099921 A1    Mar. 31, 2022

(30) Foreign Application Priority Data

Sep. 29, 2020 (JP) ............................ JP2020-163498

(51) Int. Cl.
  *G02B 7/18* (2021.01)
(52) U.S. Cl.
  CPC .................. *G02B 7/1805* (2013.01)
(58) Field of Classification Search
  CPC .................................................. G02B 7/1805
  USPC ................................................. 359/831, 833
  See application file for complete search history.

(56) References Cited

U.S. PATENT DOCUMENTS

| | | | | |
|---|---|---|---|---|
| 2018/0136438 A1* | 5/2018 | Ho | .......................... | G03B 5/00 |
| 2019/0230262 A1* | 7/2019 | Wang | ........................ | G06T 7/97 |
| 2020/0363626 A1* | 11/2020 | Seo | ......................... | G03B 30/00 |
| 2020/0379239 A1* | 12/2020 | Li | ........................... | G02B 23/08 |
| 2020/0409125 A1* | 12/2020 | Li | ....................... | G02B 13/0065 |
| 2020/0412958 A1* | 12/2020 | Li | .......................... | G02B 7/1805 |
| 2021/0063684 A1* | 3/2021 | Chen | ..................... | G02B 7/1805 |
| 2021/0063848 A1* | 3/2021 | Fan | .......................... | G01S 17/42 |
| 2021/0136261 A1* | 5/2021 | Lee | ......................... | G03B 30/00 |
| 2021/0199918 A1* | 7/2021 | Lee | ......................... | G02B 7/102 |
| 2021/0294111 A1* | 9/2021 | Egawa | ................. | G02B 27/646 |
| 2022/0011555 A1* | 1/2022 | Weng | ................... | G02B 7/1805 |
| 2022/0035174 A1* | 2/2022 | Wang | ..................... | G02B 7/005 |
| 2022/0099922 A1* | 3/2022 | Arai | ....................... | G02B 7/026 |

FOREIGN PATENT DOCUMENTS

WO    2018122650    7/2018

* cited by examiner

*Primary Examiner* — Ricky D Shafer
(74) *Attorney, Agent, or Firm* — JCIPRNET (57) ABSTRACT

An optical unit includes: a reflection portion that reflects an incident light flux incident from outside on a reflection surface in a reflection direction from an incident direction toward an imaging element; a movable body having the reflection portion and a holder supporting the reflection portion; a fixed body; a rotation support mechanism that causes the movable body to rotate with respect to the fixed body with an axial direction as a rotation axis; and a drive mechanism having a magnet and a coil and causing the movable body to rotate with respect to the fixed body. The magnet is provided at a position not contacting the reflection portion in the holder and on a back side of the reflection surface, and has a parallel surface parallel to the reflection surface. The coil is provided at a position opposing the magnet in the fixed body.

5 Claims, 9 Drawing Sheets

OPTICAL UNIT

CROSS REFERENCE TO RELATED APPLICATION

The present invention claims priority under 35 U.S.C. § 119 to Japanese Application No. 2020-163498 filed Sep. 29, 2020, and the entire content of which is incorporated herein by reference.

BACKGROUND

Field of the Invention

At least an embodiment of the present invention relates to an optical unit.

Description of the Related Documents

Various optical units have conventionally been used. Of these optical units, such an optical unit is used that causes a movable body to rotate with respect to a fixed body by using a drive mechanism having a magnet and a coil, and the movable body supports a reflection portion. For example, WO 2018/122650 discloses a camera in which the magnet and the coil rotate a holder with respect to a base, the holder supporting the reflection portions such as a prism and a mirror.

In the camera having the configuration disclosed in WO 2018/122650, the magnet that has a flat plate shape and constitutes the drive mechanism is provided only on an extension line in an incident direction of an incident light flux incident from the outside. Since downsizing of the optical unit is requested, such a configuration requires the smaller magnet, which reduces drive efficiency. In view of the above, at least an embodiment of the present invention has a purpose of improving drive efficiency in an optical unit that causes a movable body to rotate with respect to a fixed body by using a drive mechanism having a magnet and a coil, the movable body supporting a reflection portion.

SUMMARY

An optical unit according to at least an embodiment of the present invention includes: a reflection portion, configured to reflect an incident light flux incident from outside on a reflection surface in a reflection direction from an incident direction toward an imaging element; a movable body, including the reflection portion and a holder configured for supporting the reflection portion; a fixed body; a rotation support mechanism, configured to cause the movable body to rotate with respect to the fixed body with an axial direction crossing the incident direction and the reflection direction as a rotation axis; and a drive mechanism, including a magnet and a coil, and being configured to cause the movable body to rotate with respect to the fixed body. The magnet is provided at a position not contacting the reflection portion in the movable body and on a back side of the reflection surface, and has a parallel surface parallel to the reflection surface. The coil is provided at a position opposing the magnet in the fixed body.

According to the present aspect, the magnet is provided at the position not contacting the reflection portion in the movable body and on the back side of the reflection surface, and has the parallel surface parallel to the reflection surface. Then, the coil is provided at the position that opposes the magnet in the fixed body. By providing the magnet that has the parallel surface parallel to the reflection surface on the back side of the reflection surface in the movable body, the magnet can be configured to be large. This is because the reflection surface of the reflection portion is larger than an incident surface and an emitting surface. Therefore, drive efficiency can be improved. In addition, since the magnet is provided at the position not contacting the reflection portion in the movable body, a position of a rotation axis of the movable body and a position of the magnet as the drive mechanism are set not to be too close. In this way, it is possible to set a position of a fulcrum point and a position of an action point not to be too close. As a result, the drive efficiency can be improved.

In the optical unit according to at least an embodiment of the present invention, the magnet can be configured to be provided at a position including a region on an extension line of a central portion of the reflection surface in a perpendicular direction to the reflection surface. With such a configuration, the magnet can be configured to be particularly large. Therefore, it is possible to particularly improve the drive efficiency.

In the optical unit according to at least an embodiment of the present invention, the rotation axis can be configured to be located on an extension line in a direction that extends from a central portion of a region where the magnet and the coil oppose each other to an opposing direction in which the magnet and the coil oppose each other. With such a configuration, arrangement of the magnet with respect to the coil that is associated with rotation of the movable body with respect to the fixed body becomes symmetrical when seen in a rotation axis direction, and thus it is possible to particularly improve the drive efficiency.

In the optical unit according to at least an embodiment of the present invention, the fixed body can be configured to have a magnetic body on an opposite side to the magnet with reference to the coil in an opposing direction in which the magnet and the coil oppose each other. With such a configuration, the optical unit constitutes a magnetic spring that causes the magnet and the magnetic body to attract each other. Thus, it is possible to automatically adjust an origin of the position of the movable body with respect to the position of the fixed body.

In the optical unit according to at least an embodiment of the present invention, the movable body can be configured to have a magnetic body on an opposite side to the coil with reference to the magnet in an opposing direction in which the magnet and the coil oppose each other. With such a configuration, it is possible to suppress a magnetic force from the magnet from reaching the opposite side to the coil with reference to the magnet in the opposing direction.

In at least an embodiment of the present invention, it is possible to improve the drive efficiency in the optical unit that causes the movable body to rotate with respect to the fixed body by using the drive mechanism having the magnet and the coil, the movable body supporting the reflection portion.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A description will hereinafter be made on an embodiment of the present invention with reference to the drawings. In each of the drawings, an X-axis, a Y-axis, and a Z-axis represent directions orthogonal to each other. A view as seen in each of +X direction and −X direction is referred to as a side view, a view as seen in +Y direction is referred to as a plan view, a view as seen in −Y direction is referred to as a bottom view, a view as seen in +Z direction is referred to as a back view, and a view as seen in −Z direction is referred to as a front view. Further, the +Y direction corresponds to an incident direction D1, which is an incident direction of a light flux from outside.

First Embodiment

First, a description will be made on an optical unit 1A in a first embodiment that is an embodiment of an optical unit 1 according to the present invention with reference to FIG. 1 to FIG. 8.

[Overview of Device Including Optical Unit]

Figure 1:
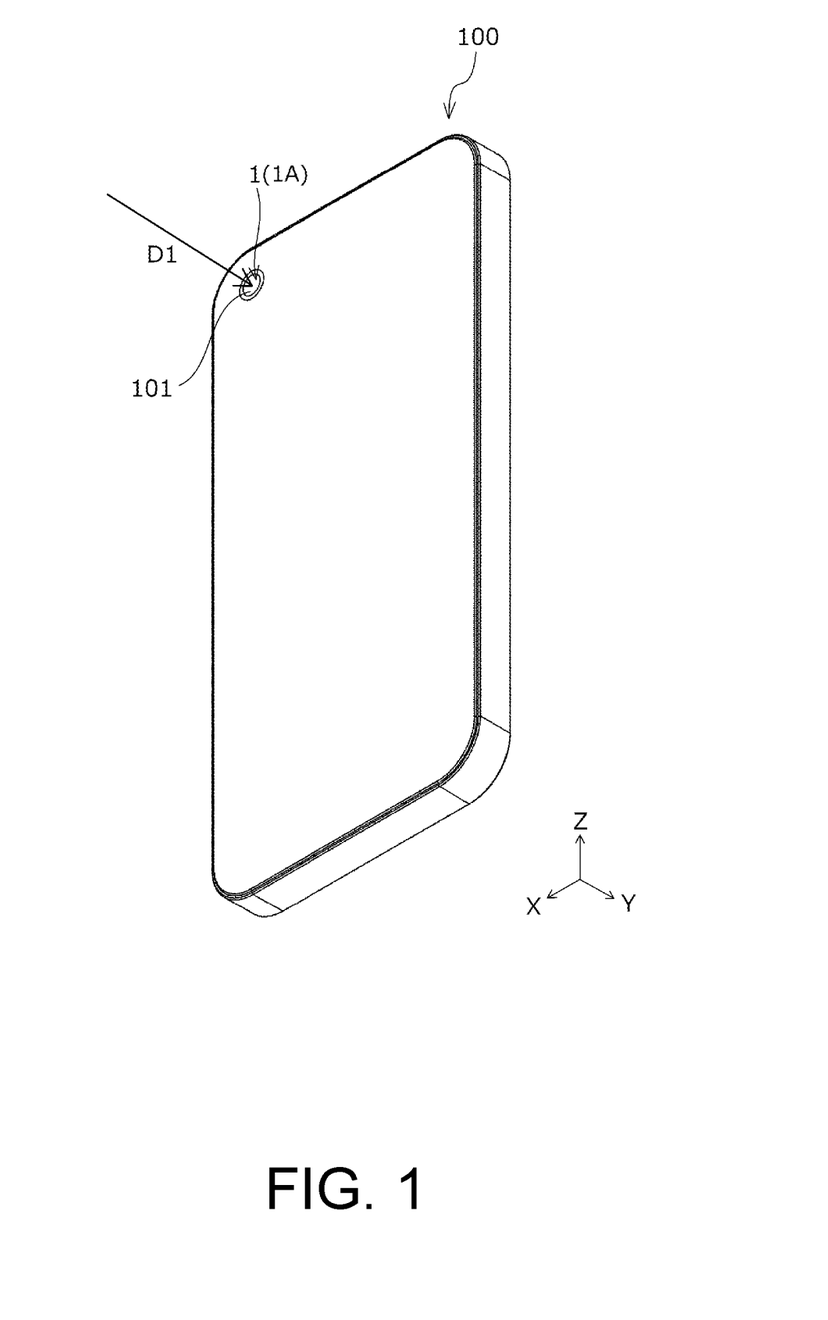
FIG. 1 is a perspective view of a smartphone that includes an optical unit according to a first embodiment of the present invention.

FIG. 1 is a schematic perspective view of a smartphone 100 as an example of a device including the optical unit 1A in the present embodiment. The optical unit 1A in the present embodiment can be preferably used in the smartphone 100. The optical unit 1A in the present embodiment can be configured to be thin, which is for making a thickness of the smartphone 100 in the Y-axis direction small. However, the optical unit 1A in the present embodiment is not limitedly applied to the smartphone 100, and can be used in various devices that are not particularly limited, such as cameras and videos.

As illustrated in FIG. 1, the smartphone 100 includes a lens 101 on which the light flux is made incident. The optical unit 1A is provided in the lens 101 of the smartphone 100. The smartphone 100 is configured to allow the light flux to be incident from the outside in the incident direction D1 via the lens 101, and to enable capturing of a subject image on the basis of the incident light flux.

[Overall Configuration of Optical Unit]

Figure 2:
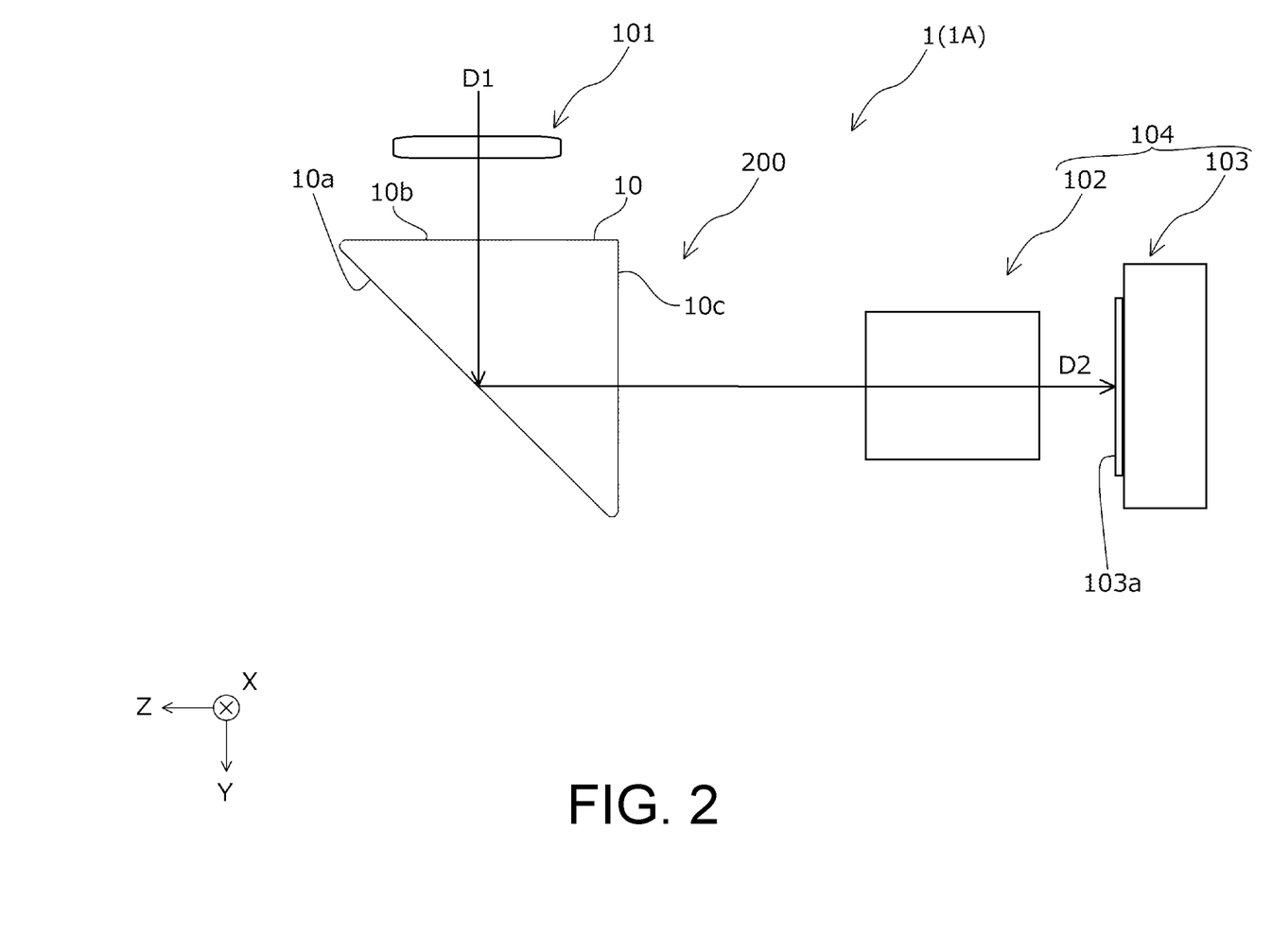
FIG. 2 is a schematic side view of the optical unit according to the first embodiment of the present invention.

FIG. 2 is a side view schematically illustrating the optical unit 1A in the present embodiment. As illustrated in FIG. 2, the optical unit 1A in the present embodiment has: a reflection unit 200 as a movable body that has a prism 10 as a reflection portion; and a camera 104 that has a lens 102 and a substrate 103 provided with an imaging element 103a. The reflection unit 200 has an incident surface 10b through which the light flux enters in the incident direction D1 from the outside via the lens 101, reflects the incident light flux on a reflection surface 10a of the prism 10, and emits the incident light flux from an emitting surface 10c toward the imaging element 103a in a reflection direction D2. Although the reflection unit 200 in the present embodiment includes the prism 10 as the reflection portion, the configuration of the reflection portion is not limited to the prism 10. That is, the reflection unit 200 may, for example, employ a configuration including a mirror as the reflection portion. The incident direction D1 is along the Y-axis direction, while the reflection direction D2 is substantially along the Z-axis direction but changes due to displacement of the prism 10.

[Configuration of Reflection Unit as Movable Body]

Figure 3:
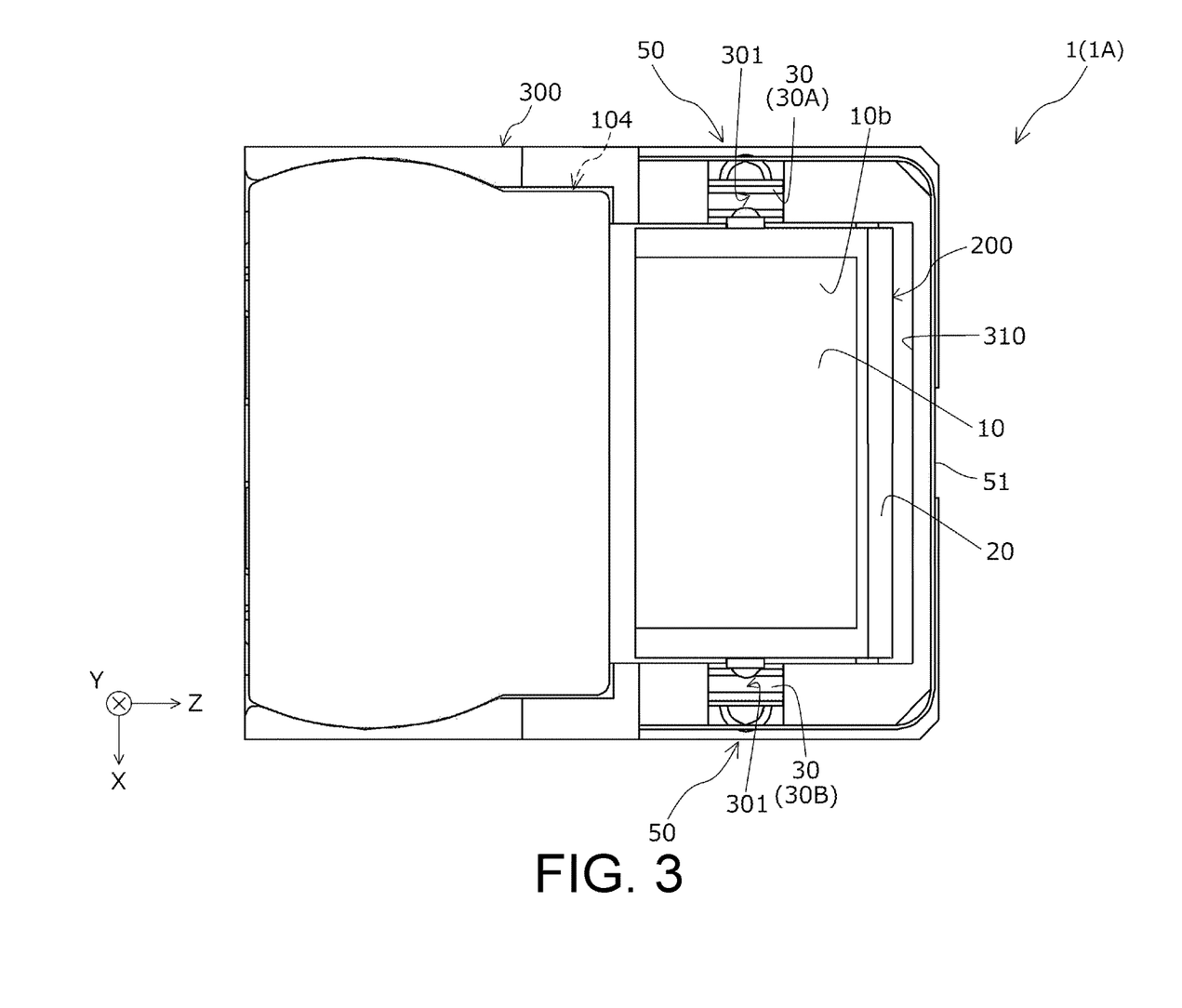
FIG. 3 is a plan view of the optical unit according to the first embodiment of the present invention.
Figure 4:
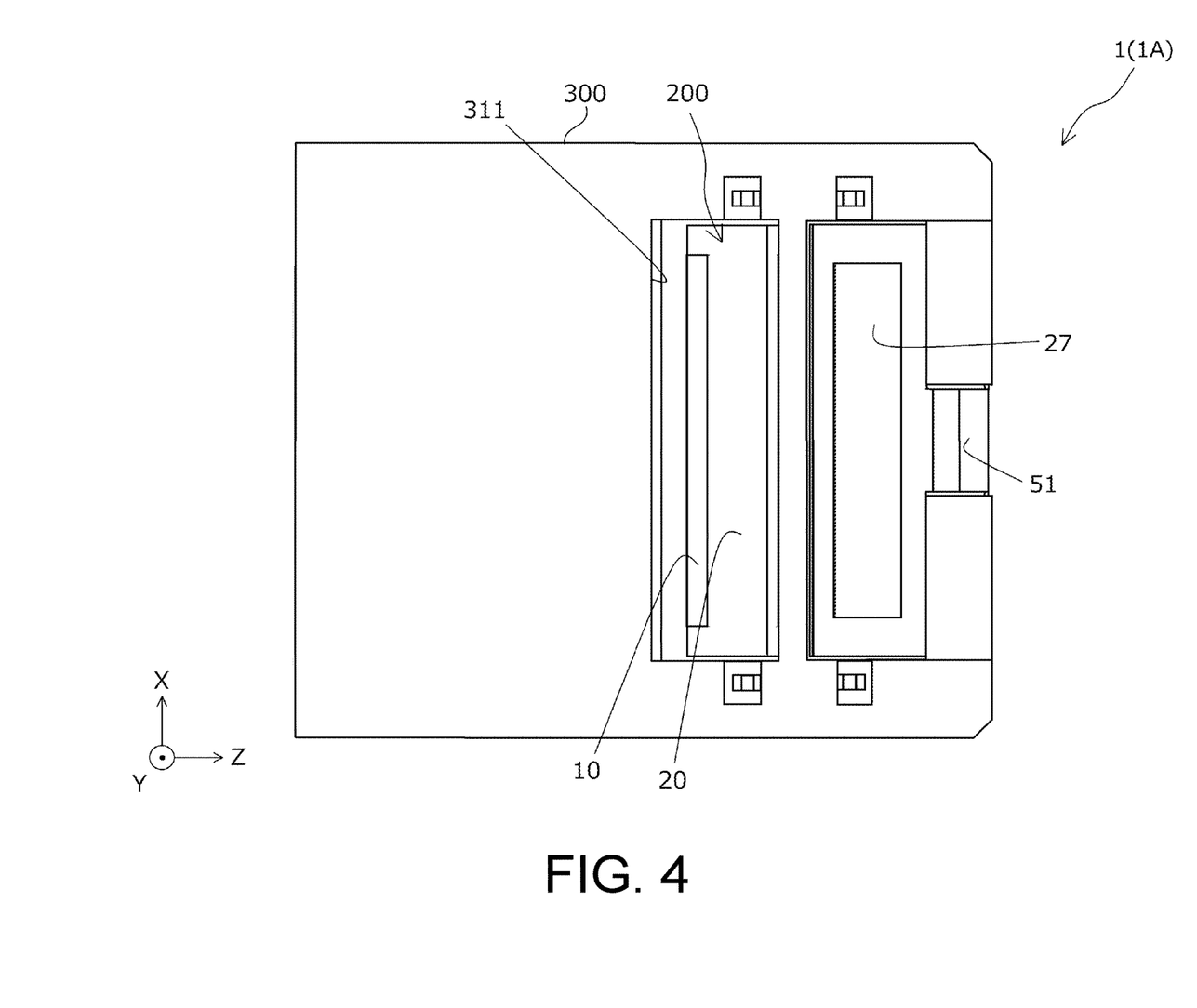
FIG. 4 is a bottom view of the optical unit according to the first embodiment of the present invention.
Figure 5:
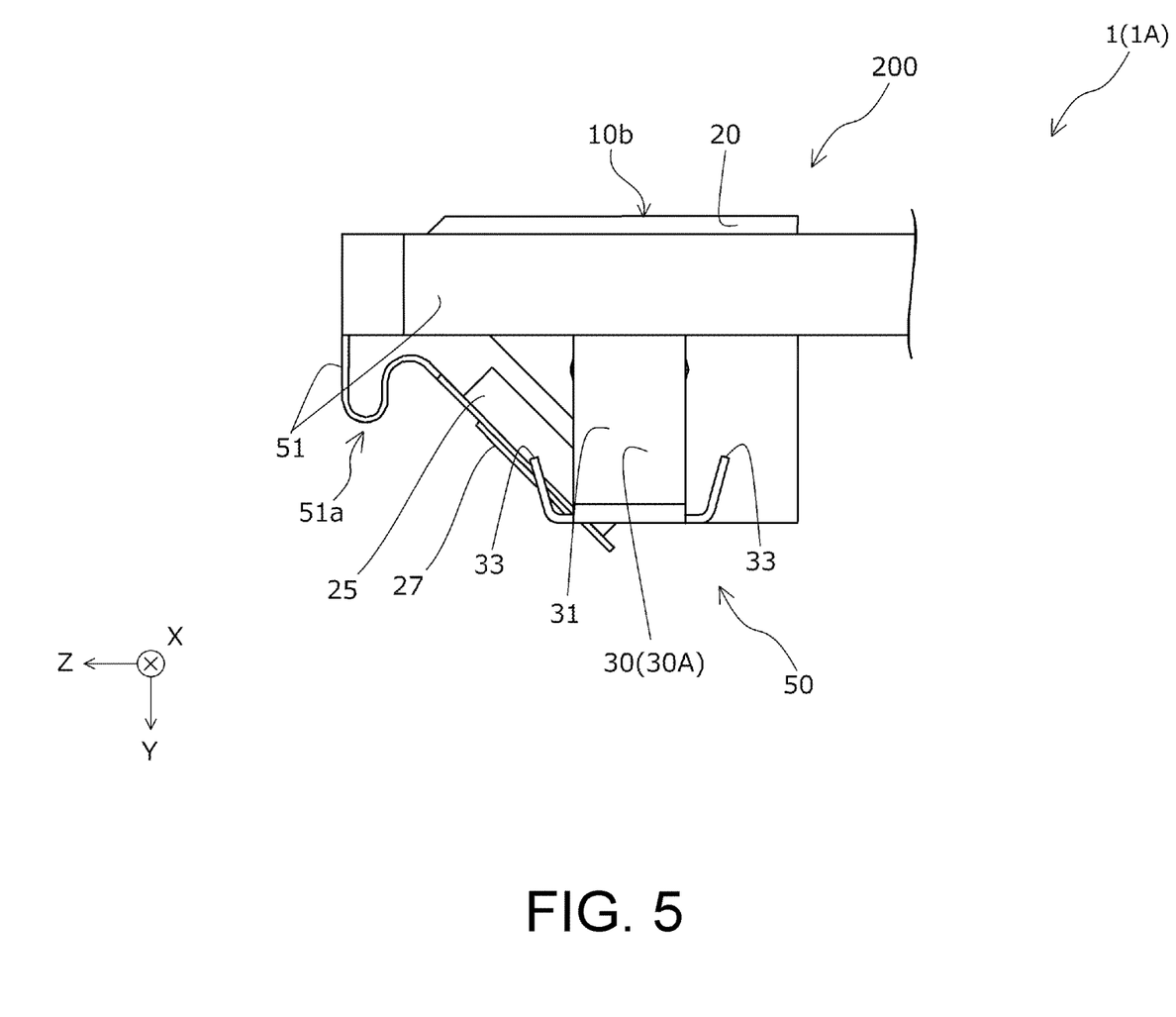
FIG. 5 is a side view illustrating a part of an internal configuration of the optical unit according to the first embodiment of the present invention.
Figure 6:
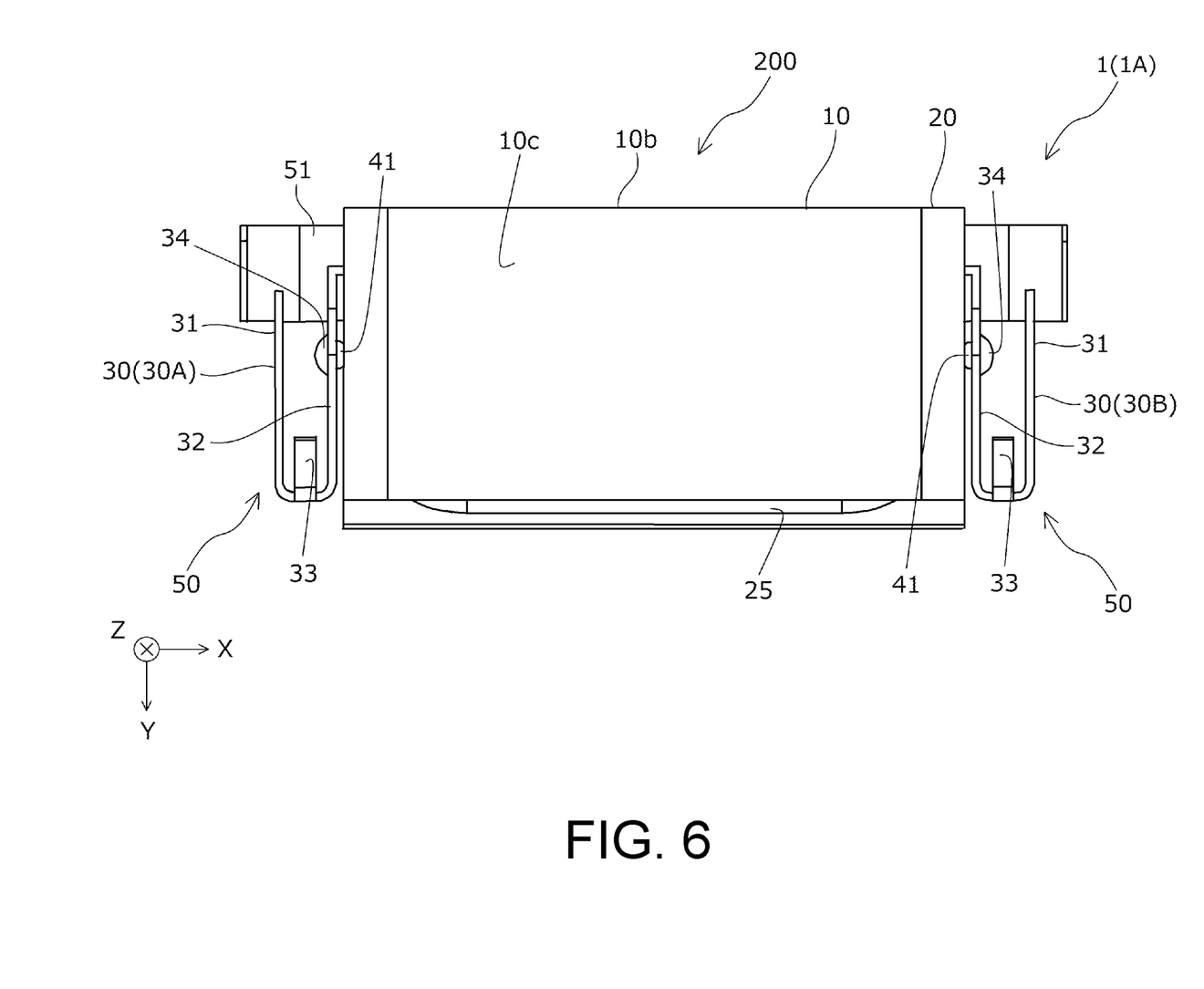
FIG. 6 is a front view illustrating a part of the internal configuration of the optical unit according to the first embodiment of the present invention.
Figure 7:
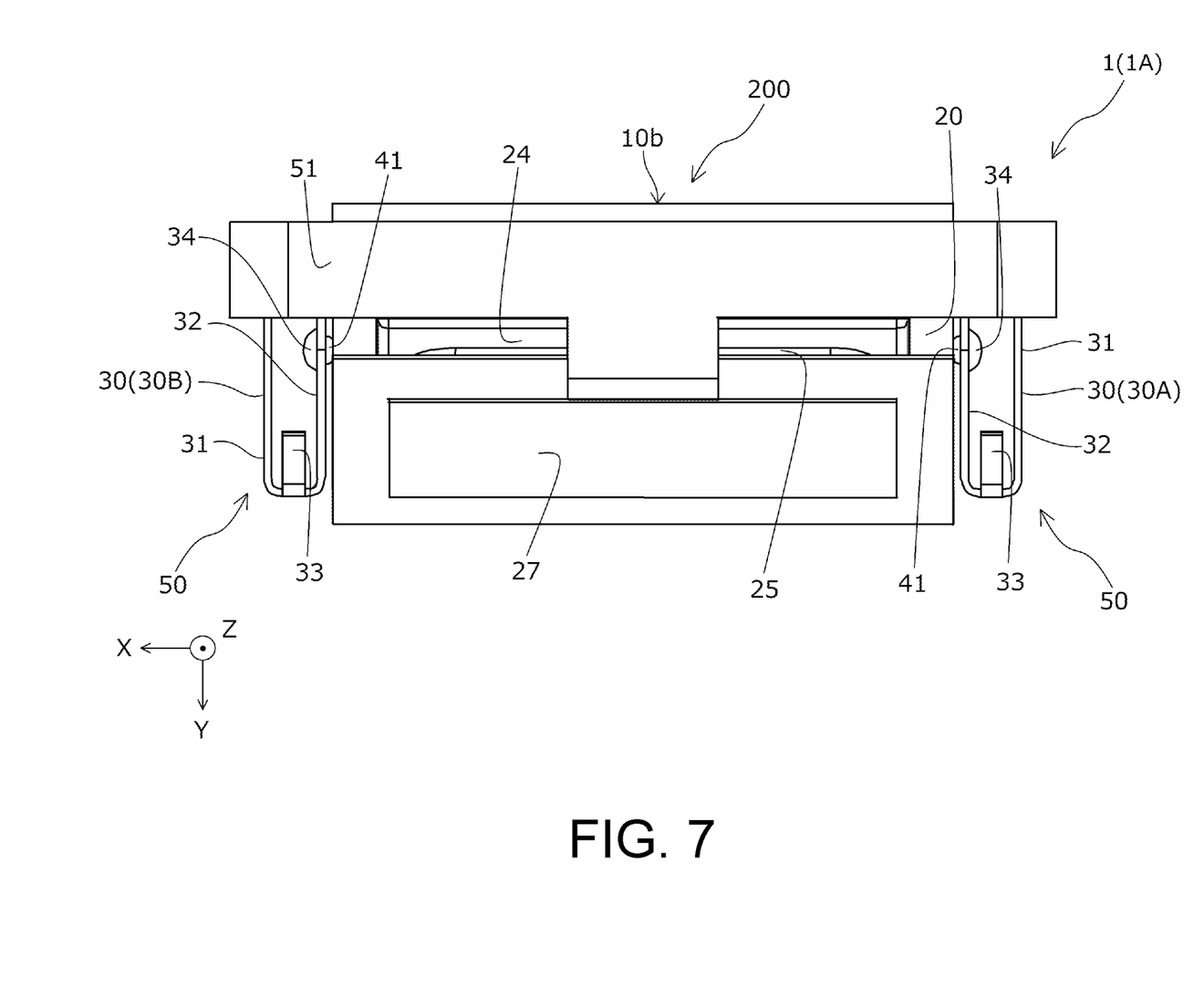
FIG. 7 is a back view illustrating a part of the internal configuration of the optical unit according to the first embodiment of the present invention.

FIG. 3 is a plan view of the optical unit 1A in the present embodiment. FIG. 4 is a bottom view of the optical unit 1A in the present embodiment. FIG. 5 is a side view illustrating an internal configuration of a peripheral portion of the reflection unit 200 in the optical unit 1A of the present embodiment. FIG. 6 is a front view illustrating the internal configuration of the peripheral portion of the reflection unit 200 in the optical unit 1A of the present embodiment. FIG. 7 is a back view illustrating the internal configuration of the peripheral portion of the reflection unit 200 in the optical unit 1A of the present embodiment. The optical unit 1A in the present embodiment is configured that the reflection unit 200 can rotate with respect to a fixed body 300 with the X-axis direction being a rotation axis C (see FIG. 8). As illustrated in FIG. 3 to FIG. 7, the reflection unit 200 has the prism 10 and a holder 20 that supports the prism 10.

The holder 20 is a frame body that is constructed separately from the prism 10 and that supports the prism 10. Thus, the reflection unit 200 is a movable body that supports the reflection portion. The holder 20 has a spherical body 41 at an end in the −X direction and at an end in the +X direction. The spherical body 41 is engaged with a concave portion 34 of a spring member 30 that is fixed to the fixed body 300, and, together with the concave portion 34, constitutes the rotation axis C in the X-axis direction. Since the holder 20 has such a configuration and includes a rotation support mechanism 50 having the concave portion 34 and the spherical body 41, in a state of supporting the prism 10, the reflection unit 200 can rotate with respect to the fixed body 300 with the X-axis direction being the rotation axis C.

[Fixed Body]

As illustrated in FIG. 3, the fixed body 300 fixes the two spring members 30 that are a spring member 30A and a spring member 30B to a fixing portion 301, and holds the reflection unit 200 between the spring member 30A and the spring member 30B by the spring member 30A and the spring member 30B such that the reflection unit 200 can rotate with the X-axis direction being the rotation axis C. In addition, the camera 104 is held in the reflection unit 200 on the −Z direction side.

As illustrated in FIG. 3, an opening 310 is provided and opened on the −Y direction side in the fixed body 300 in arrangement in which the entire reflection unit 200 is visible. As illustrated in FIG. 4, an opening 311 is provided on the +Y direction side in the fixed body 300 in arrangement in which a part of the reflection unit 200, that is, a part of the reflection unit 200 protruding to the +Y direction side is visible. With such a configuration, the reflection unit 200 is prevented from colliding with the fixed body 300 on the +Y direction side and −Y direction side when the reflection unit 200 rotates with respect to the fixed body 300. On the +Z direction side of the fixed body 300, a depression 320 (see FIG. 8) is formed in a manner not to reduce a rotatable range of the reflection unit 200 with respect to the fixed body 300.

When expressed differently, in the optical unit 1A of the present embodiment, the fixed body 300 is formed with the depression 320 and the openings 310, 311 on an extension line of a moving direction associated with the rotation of the reflection unit 200. Just as described, it is configured that the depression 320 or the openings 310, 311 are formed on the extension line of the moving direction associated with the rotation of the reflection unit 200. In this way, it is possible to particularly effectively expand a movable range of the reflection unit 200 with respect to the fixed body 300.

However, the reflection unit 200 can be brought into contact with the depression 320 of the fixed body 300 when the reflection unit 200 rotates significantly with respect to the fixed body 300. When expressed differently, the depression 320 serves as a regulation portion that regulates a rotation amount of the reflection unit 200 with respect to the fixed body 300. The depression 320 and a portion of the reflection unit 200 that contacts the depression 320 are both collision-resistant portions. Thus, even when the depression 320 collides with such portions, the reflection unit 200 and the fixed body 300 are not damaged.

[Rotation Support Mechanism]

The rotation support mechanism 50 is a rotation support mechanism for the reflection unit 200 with respect to the fixed body 300 and can cause the reflection unit 200 to rotate with respect to the fixed body 300 with the X-axis direction, which crosses the incident direction D1 (the Y-axis direction) and the reflection direction D2 (the Z-axis direction), being the rotation axis C.

The rotation support mechanism 50 has: the spherical body 41 that is fixed to the holder 20; and the spring member 30 that is fixed to the fixed body 300. As illustrated in FIG. 5 to FIG. 7, the spring member 30 has: an inner flat-plate portion 32 that is provided with the concave portion 34 as a spherically-depressed spherical concave surface; and an outer flat-plate portion 31 that is directed to oppose the inner flat-plate portion 32 by bending the spring member 30 into a U-shape with reference to a root portion. The inner flat-plate portion 32 and the outer flat-plate portion 31 have a plate spring structure in which a force is applied in a direction away from each other on a side opposite to the root portion. In addition, the spring member 30 includes two protruding portions 33 that extend in different directions from the inner flat-plate portion 32 and the outer flat-plate portion 31 of the root portion. The two protruding portions 33 are provided at mutually opposing positions and are structured such that the force in a direction away from each other is applied thereto on the side opposite to the root portion.

The spring member 30 is inserted in the fixing portion 301 in the +Y direction with the root portion side being a leading direction, and is thereby fixed to the fixing portion 301. Here, the fixing portion 301 is formed with an eave portion in which the protruding portion 33 is caught when the spring member 30 is inserted deep into the fixing portion 301. Since the spring member 30 and the fixing portion 301 have such shapes, the spring member 30 is inserted deep into the fixing portion 301. In this way, the spring member 30 is fixed to the fixing portion 301.

As described above, since the inner flat-plate portion 32 and the outer flat-plate portion 31 constitute the plate spring structure in which the force in the direction away from each other is applied thereto on the side opposite to the root portion, the concave portion 34 is pressed onto the spherical body 41 side. For this reason, a preload in a direction along the X-axis direction is applied to the reflection unit 200 via the spherical body 41 by the spring member 30. Then, a contact point between the concave portion 34 and the spherical body 41 serves as the rotation axis C of the reflection unit 200 with respect to the fixed body 300. Here, the rotation axis C extends in a direction along the X-axis direction, and is arranged to pass through a center of gravity of the entire reflection unit 200.

[Drive Mechanism]

Next, a description will be made on a drive mechanism 60 that drives the reflection unit 200 supported by the rotation support mechanism 50. The drive mechanism 60 is a drive mechanism that has a magnet 24 and a coil 25 and causes the reflection unit 200 to rotate with respect to the fixed body 300.

Figure 8:
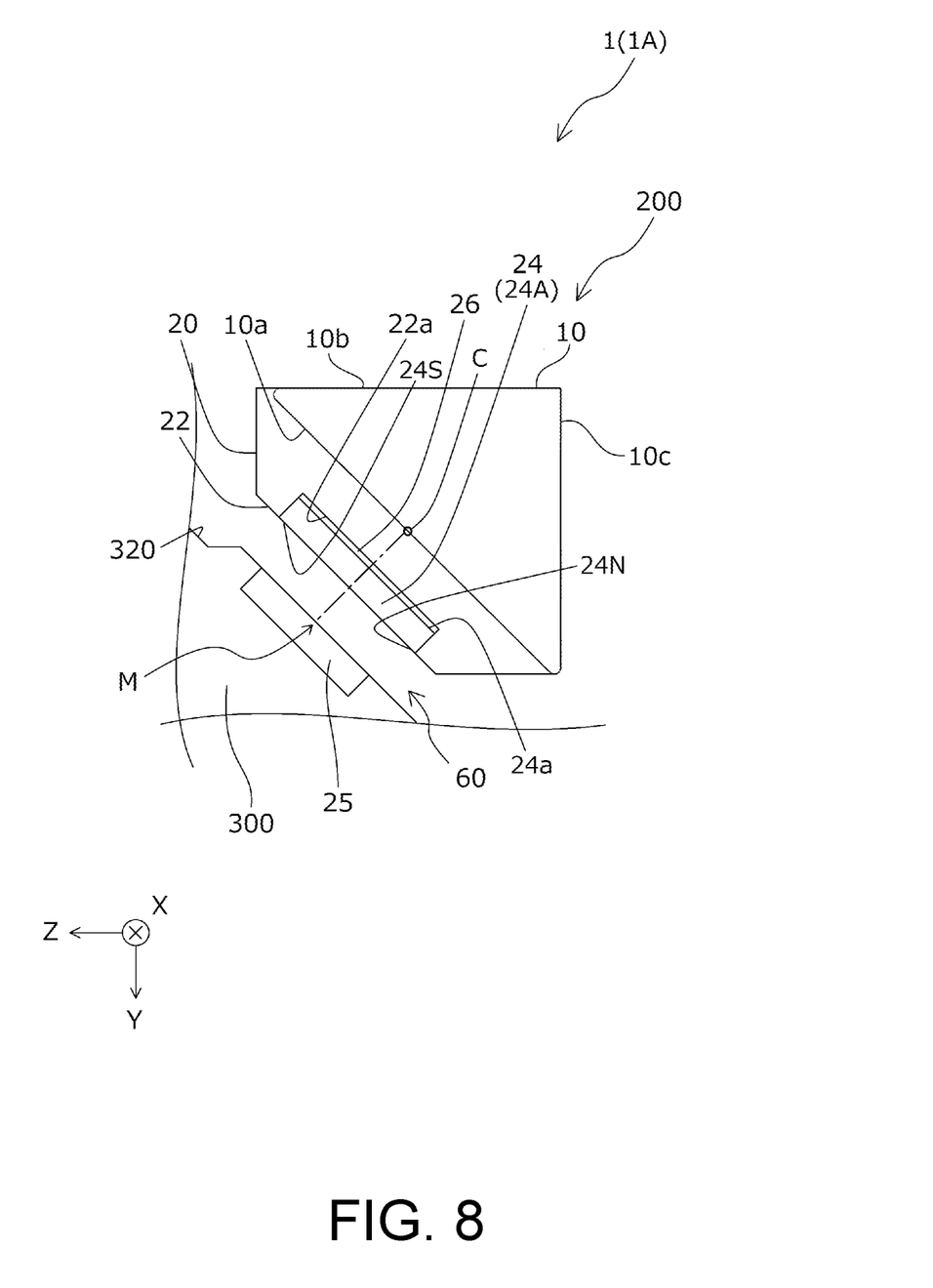
FIG. 8 is a schematic side cross-sectional view of the optical unit according to the first embodiment of the present invention.

FIG. 8 is a schematic side cross-sectional view of the optical unit 1A in the present embodiment. As illustrated in FIG. 8, the drive mechanism 60 has: the magnet 24 that is placed on a placement portion 22a of a back surface 22 of the holder 20; and the coil 25 that is formed in the fixed body 300. The magnet 24 is a flat-plate magnet having an N-pole portion 24N and an S-pole portion 24S, and is placed on and fixed to the placement portion 22a while being bonded to a flat-plate iron yoke 26.

As illustrated in FIG. 8, the magnet 24 is provided at a position that does not contact the reflection portion (the prism 10) in the holder 20 of the reflection unit 200 and on a back side of the reflection surface 10a. Here, the "back side" means a side of the prism 10 opposite to a moving path of the light flux (a side with the incident surface 10b and the emitting surface 10c). In addition, the "position that does not contact the reflection portion" means not only a position that does not come into contact with the reflection portion in a strict sense, but also a position that does not come into direct contact with a portion that is integrally configured with the reflection portion if such a portion exists. The magnet 24 has a parallel surface 24a that is parallel to the reflection surface 10a. The coil 25 is provided at a position that opposes the magnet 24 in the fixed body 300.

As described above, when it is configured that the magnet 24 having the parallel surface 24a, which is parallel to the reflection surface 10a, is provided on the back side of the reflection surface 10a in the reflection unit 200, it is possible to arrange the large magnet 24. As illustrated in FIG. 8, this is because the reflection surface 10a is larger than the incident surface 10b and the emitting surface 10c. Thus, drive efficiency can be improved by such a configuration. In addition, since the magnet 24 is provided at the position in the reflection unit 200 that does not contact the prism 10, a position of the rotation axis C of the reflection unit 200 and a position of the magnet 24 constituting the drive mechanism 60 are set not to be too close. In this way, it is possible to set a position of a fulcrum point (the position of the rotation axis C in FIG. 8) and a position of an action point (the position of the magnet 24) not to be too close. As a result, the drive efficiency can be improved.

Here, in the optical unit 1A of the present embodiment, the magnet 24 is provided at a position that overlaps a central portion of the reflection surface 10a (the position of the rotation axis C in FIG. 8 in the present embodiment) when seen from a perpendicular direction to the reflection surface 10a (a dashed line direction in FIG. 8). When expressed differently, the magnet 24 is provided at a position including a region on the extension line of the central portion of the reflection surface 10a in the perpendicular direction to the reflection surface 10a. With such a configuration, the magnet 24 can be configured to be particularly large. Thus, it is possible to particularly improve the drive efficiency by such a configuration.

When a description will be made from a perspective of the arrangement of the rotation axis C, in the optical unit 1A of the present embodiment, the rotation axis C arranged at a position on an extension line (in other words, on a vertical bisector of a region where the magnet 24 and the coil 25 oppose each other when seen from a rotation axis direction as illustrated in FIG. 8) in a direction that extends from a central portion M of a region where the magnet 24 and the coil 25 oppose each other to an opposing direction in which the magnet 24 and the coil 25 oppose each other (the dashed line direction in FIG. 8). With such a configuration, the arrangement of the magnet 24 with respect to the coil 25 that is associated with the rotation of the reflection unit 200 with respect to the fixed body 300 becomes symmetrical (symmetrical with reference to the dashed line in FIG. 8) when seen in the rotation axis direction as illustrated in FIG. 8, and thus it is possible to particularly improve the drive efficiency.

As illustrated in FIG. 4, FIG. 5, and FIG. 7, in the optical unit 1A of the present embodiment, the fixed body 300 has a magnetic body 27 on an opposite side to the magnet 24 with reference to the coil 25 in the opposing direction in which the magnet 24 and the coil 25 oppose each other. With such a configuration, the optical unit 1A in the present embodiment constitutes a magnetic spring that causes the magnet 24 and the magnetic body 27 to attract each other. Thus, it is possible to automatically adjust an origin of the position of the reflection unit 200 with respect to the position of the fixed body 300.

In addition, as illustrated in FIG. 8, in the optical unit 1A of the present embodiment, the reflection unit 200 is configured to have the yoke 26 as a magnetic body on the opposite side to the coil 25 with reference to the magnet 24 in the opposing direction in which the magnet 24 and the coil 25 oppose each other. Here, there is a case where a component that is easily affected by a magnetic force is arranged on a side with the camera 104 from the reflection unit 200 in the fixed body 300 (on the −Z direction side), that is, on the opposite side to the coil 25 with reference to the magnet 24 in the opposing direction in which the magnet 24 and the coil 25 oppose each other. However, since the optical unit 1A in the present embodiment is configured to have the yoke 26 in such arrangement, it is possible to suppress the magnetic force from the magnet 24 from reaching the opposite side to the coil 25 with reference to the magnet 24 in the opposing direction.

The coil 25 is connected to a flexible wiring board 51. Here, as illustrated in FIG. 5, a sag 51a is formed in the flexible wiring board 51. In this way, workability at the time of attaching the coil 25 to the fixed body 300 is improved.

Second Embodiment

Figure 9:
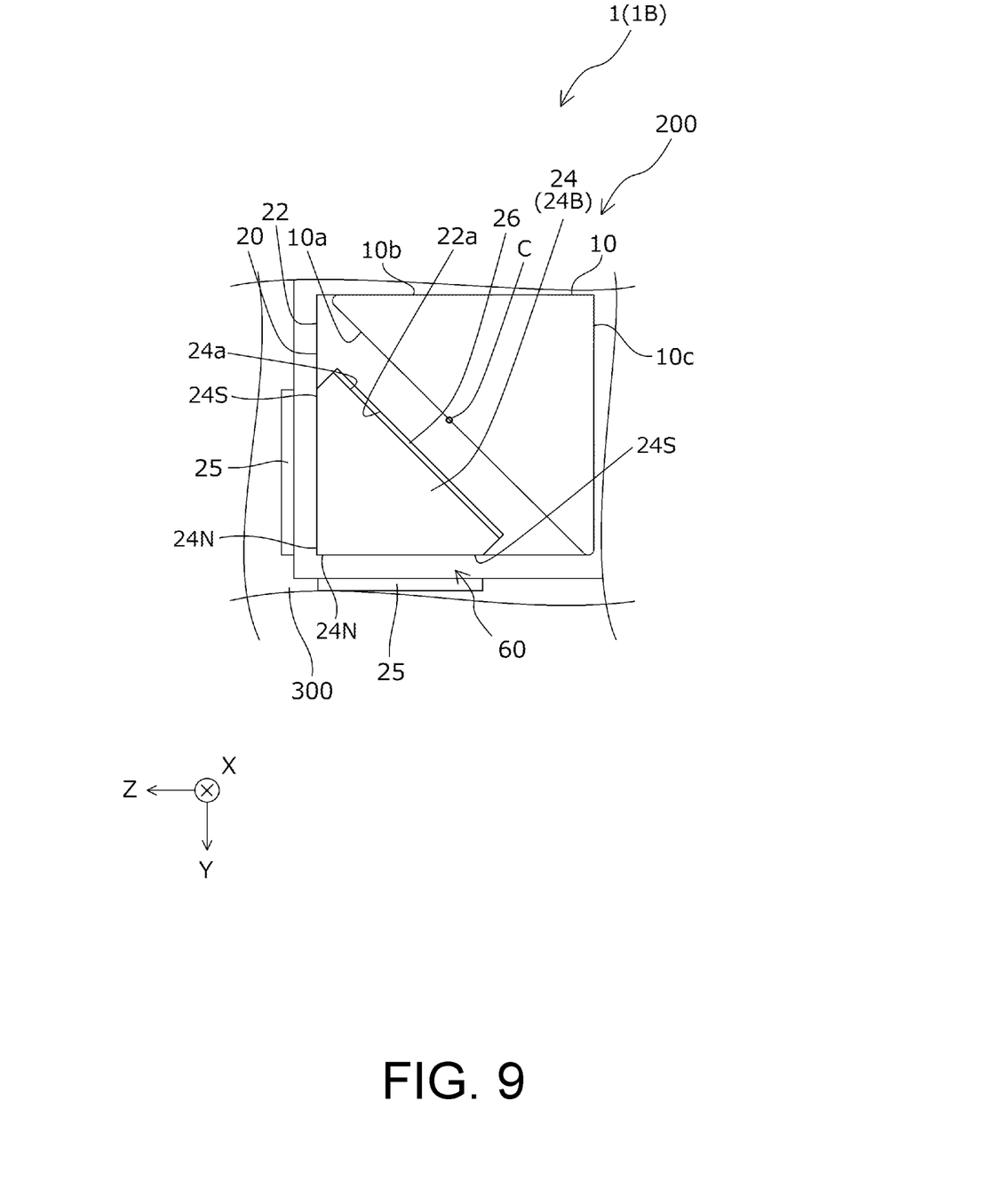
FIG. 9 is a schematic side cross-sectional view of an optical unit according to a second embodiment of the present invention.

Next, a description will be made on the optical unit 1 according to a second embodiment with reference to FIG. 9. Here, FIG. 9 is a schematic side cross-sectional view of an optical unit 1B in the present embodiment and is a view corresponding to FIG. 8 in the optical unit 1A of the first embodiment. Here, common components to those in the first embodiment will be denoted by the same reference numerals, and a detailed description thereon will not be made. The optical unit 1B in the present embodiment has the same configuration as the optical unit 1A in the first embodiment except for a configuration of portions, which will be described below. Thus, the optical unit 1B has the same technical features as the optical unit 1A in the first embodiment except for the portions, which will be described below.

As illustrated in FIG. 8, the optical unit 1A in the first embodiment includes, as the magnet 24 having the parallel surface 24a parallel to the reflection surface 10a, a flat-plate magnet 24A in which the parallel surface 24a is arranged parallel to the reflection surface 10a. Meanwhile, the optical unit 1B in the present embodiment has, as the magnet 24 having the parallel surface 24a parallel to the reflection surface 10a, a magnet 24B that is not flat-plate shaped but is substantially triangular in a side view, has the parallel surface 24a parallel to the reflection surface 10a, and has a surface having the N-pole portion 24N and the S-pole portion 24S in the +Y direction and the +Z direction, respectively. In addition, the optical unit 1B includes the coil 25 at a position that opposes the magnet 24B in a manner to correspond to both a plane in +Y-direction and a plane in the +Z-direction. As long as the magnet 24 has the parallel surface 24a parallel to the reflection surface 10a, a shape of the magnet 24 is not particularly limited.

The present invention is not limited to the above-described embodiments, and can be implemented with various configurations within the scope that does not depart from the gist of the present invention. For example, the technical features in the embodiments corresponding to the technical features in each of the aspects described in SUMMARY may be appropriately replaced or combined to solve some or all of the problems described above, or to achieve some or all of the effects described above. Further, unless the technical features are described as essential in the present specification, it may be omitted as appropriate.

What is claimed is:

1. An optical unit comprising:
a reflection portion, configured to reflect an incident light flux incident from outside on a reflection surface in a reflection direction from an incident direction toward an imaging element;
a movable body, including the reflection portion and a holder configured for supporting the reflection portion;
a fixed body;
a rotation support mechanism, configured to cause the movable body to rotate with respect to the fixed body with an axial direction crossing the incident direction and the reflection direction as a rotation axis; and
a drive mechanism, including a magnet and a coil, and the magnet and the coil being configured to cause the movable body to rotate with respect to the fixed body, wherein
the magnet of the drive mechanism is provided at a position not contacting the reflection portion in the holder and on a back side of the reflection surface, and includes a parallel surface parallel to the reflection surface,
the holder comprises a placement portion for the magnet on the back side of the reflection surface, and the placement portion is formed so that the parallel surface of the magnet is set to be parallel to the reflection surface, and
the coil of the drive mechanism is provided at a position opposing the magnet in the fixed body on the back side of the reflection surface and thereby, the holder supporting the reflection portion is capable of being rotated by the magnet whose parallel surface is parallel to the reflection surface and the coil.

2. The optical unit according to claim 1, wherein
the magnet is provided at a position including a region on an extension line of a central portion of the reflection surface in a perpendicular direction to the reflection surface.

3. The optical unit according to claim 2, wherein
the rotation axis is located on an extension line in a direction that extends from a central portion of a region where the magnet and the coil oppose each other to an opposing direction in which the magnet and the coil oppose each other.

4. The optical unit according to claim 1, wherein
the fixed body comprises a magnetic body on an opposite side to the magnet with reference to the coil in an opposing direction in which the magnet and the coil oppose each other.

5. The optical unit according to claim 1, wherein
the movable body comprises a magnetic body on an opposite side to the coil with reference to the magnet in an opposing direction in which the magnet and the coil oppose each other.

* * * * *